United States Patent [19]

Beale et al.

[11] 4,451,489

[45] May 29, 1984

[54] SUGAR BEET PULP BULKING AGENT AND PROCESS

[75] Inventors: Robert J. Beale, New Rochelle; Allen G. W. Bradbury, Tarrytown; Darrell G. Medcalf, Chappequa; William R. Romig, Yorktown Heights, all of N.Y.

[73] Assignee: General Foods Corporation, White Plains, N.Y.

[21] Appl. No.: 355,406

[22] Filed: Mar. 8, 1982

[51] Int. Cl.$^3$ ............................................. A23L 1/277
[52] U.S. Cl. .................................... 426/254; 426/258; 426/259; 426/269; 426/429; 426/431; 426/640; 426/616; 426/804
[58] Field of Search ............... 426/258, 259, 804, 616, 426/429, 431, 269, 640, 254

[56] References Cited

U.S. PATENT DOCUMENTS

| | | | |
|---|---|---|---|
| 2,452,750 | 11/1948 | Halliday | 426/640 |
| 3,484,254 | 12/1969 | Peterson | 426/431 |
| 4,241,093 | 12/1980 | Farag et al. | 426/258 |

OTHER PUBLICATIONS

Braddock et al., Carbohydrate Fiber from Orange Albedo., Jour. Food Sci., vol. 46, 1981, pp. 650, 654.
Braddock et al., Carbohydrate Fiber from Orange Albedo, Jour. Food Sci., vol. 46, 1981, pp. 650–654.

Primary Examiner—Jeanette M. Hunter
Attorney, Agent, or Firm—T. A. Marcoux; T. R. Savoie; D. J. Donovan

[57] ABSTRACT

The invention relates to a process for producing a noncaloric sugar beet pulp bulking agent comprising placing sugar beet pulp slices, particles or spent cossettes into a stabilizing solution to prevent darkening, water-washing to remove a majority of soluble carbohydrates, contacting with an alcoholic solution to remove color and bitter constituents, removing water and alcohol and milling to a flour consistency. The sugar beet pulp bulking agent is especially useful as a partial replacement for high-caloric ingredients such as flour, fat and/or sugar in a food product with at least a one-third reduction in caloric density, more preferably from 50% to 75% or higher. The sugar beet pulp bulking agent has a high water binding capacity of from 15 to 25 grams of water per 1 gram of bulking agent.

20 Claims, No Drawings

SUGAR BEET PULP BULKING AGENT AND PROCESS

TECHNICAL FIELD

This invention relates to a process for producing a non-caloric bulking agent from sugar beet pulp which can be used to partially replace high-caloric ingredients, such as flour, fat and/or sugar to prepare a food product with at least a one-third reduction in calories, more preferably from 50% to 75% or higher. Also, the sugar beet pulp bulking agent is useful as a source of fiber to be incorporated into a food product.

BACKGROUND ART

There is increasing interest in foodstuffs having a reduced caloric content, and especially in low-calorie, baked goods. Such baked goods are desirable for reducing body weight in persons who are obese, without using appetite suppressants, and also for preventing unwanted weight gain in normal persons. One approach to reducing the caloric value of baked goods has been to replace part of the flour or other carbohydrate components (e.g., sugar or starch) with agents that are substantially non-digestible, and hence low in calories. For example, various forms of purified plant cellulose, such as alpha-cellulose sold under the tradename "Solka-Floc," and microcrystalline cellulose sold under the tradename "Avicel," have been proposed as partial flour substitutes.

When these conventional cellulose materials are used as bulking agents in a food recipe, the final food product is not smooth, has a gritty mouthfeel when chewed, gives the impression of the presence of an additional insoluble or residual substance and tends to accumulate in the mouth. Soluble cellulose derivatives have also been used as bulking agents but tend to form unpalatable, gummy masses in the mouth. It is generally agreed, however, that caloric reduction of as high as 33% to 75% in baked goods is extremely desirable, and heretofore it has not been possible to achieve these calorie reduction levels by the use of cellulosic flour replacement alone to produce a high quality product.

In 1980, over 23 million tons (46 billion pounds) of sugar beets were harvested in the United States. Approximately 1.15 million tons of sugar beet pulp are produced as a waste product of the sugar industry. Today there are about 60 sugar beet processing factories located across the United States. The typical production volume is 3,750 tons of beets per day for a 120 day season. This waste product of the sugar industry is currently used as cattle feed.

Typically, sugar beets that are received from growers are partially cleansed of extraneous material by passing over screens and rakes. The beets are then stored in large piles for up to three months as they await processing. The stored beets are conveyed to the process with a water flume. The beets are then cleaned by being sprayed with water. The washed sugar beets are then sliced into long, thin strips, like shoe-string potatoes, using a rotary slicer. The cossettes thus obtained are about 3 or 4 mm. thick and 4 to 5 cm. long. The sugar beet cossettes are then water extracted in a diffuser usually by continuous counter current extraction to yield an extract of water-soluble components which are recovered for their sugar content. Thereafter, the spent sugar beet cossettes or pulp is dewatered usually in a twin screw press or other like process. The pressed pulp can be blended with molasses and/or concentrated filtrate from the refining of the extract and dried to form a material which is used as an animal feed.

U.S. Pat. No. 4,241,093 entitled Food Supplement From Vegetable Pulp and Method For Preparing Same, issued to Farag et al. teaches a process for producing a bland food supplement useful as a filler, extender or protein binder from a water-extracted vegetable pulp such as sugar beet pulp which is processed by contacting the water-extracted pulp with an aqueous bleaching solution, separating the bleached pulp from the bleaching solution and drying. The food supplement so obtained has a composition by weight of about 4 to 8% water, about 7 to 9% crude protein, about 15 to 25% crude fiber, about 60 to 70% nitrogen-free extract and about 2.5% to 5% ash.

The present inventors set out to compare their sugar beet pulp bulking agent with the Farag food supplement material. They followed the process outlined in the Farag patent. Specifically, thirty pounds of sugar beet shreds were hot water extracted and the heavy liquor containing sugar and other solubles was discarded. The insoluble pulp was water-washed, and the drained pulp was subjected to bleaching with 2% hydrogen peroxide, screen drained and rinsed with cold water. The processed material was then dried and ground to an average particle size of approximately 110 microns. The bulk powder had a noticeable brown color and objectionable sawdust-like aroma. Thereafter the material was evaluated by incorporating it into a cake recipe in a similar fashion compared to the product of the present invention. The cake product thus obtained possessed a strong off-flavor, a dark brown off-color and had a extremely bitter taste and gummy mouthfeel when ingested.

DISCLOSURE OF THE INVENTION

The present invention discloses a process for producing a sugar beet pulp bulking agent which is bland, decolorized and non-caloric and which can be incorporated into food products at levels of from 0.1% to 60% by weight, dry basis, as a partial replacement for high-caloric ingredients, such as flour, fat and/or sugar. The product of this invention is useful in formulating a food product with at least a one-third reduction in calories, more preferably from 50–75% or more. The caloric reduction results from either the high water binding capacity of the sugar beet pulp bulking agent or from dilution of high caloric ingredients in foodstuffs or a combination of the two. The product of the present invention is also a good source of fiber which may be incorporated into a foodstuff, particularly a cereal product.

The process involves coarsely grinding or slicing the sugar beet pulp material to form coarse particles, slices or cossettes. Alternatively sugar beet cossettes can be collected from a processing plant after the cossettes have been extracted to remove sugar. This material is then promptly placed in a stabilizer solution to prevent darkening of the pulp, and water-washed to remove substantially all of the soluble carbohydrates. Thereafter, the water-washed sugar beet pulp is contacted with an alcoholic solution to remove color and flavor. Thereafter, the water and alcohol are removed and the material is optionally ground to a flour consistency.

The source material for the new product of this invention is sugar beet pulp which is a waste by-product of the sugar industries which is available in large quantities. Sugar beet pulp in the form of sugar beet cossettes can be collected from a sugar beet processing plant at a point in the conventional process after the sugar is extracted or when the pulp exits from the dewatering press procedure. Alternatively, sugar beet pulp material can be coarsely ground or sliced to produce material which is of the proper particle size in order to facilitate the extraction process. The sugar beet pulp particles or slices after being coarsely ground should be ¼ inch or less, preferably less than ⅛ inch. Slicing of sugar beets is preferable because grinding can produce excessive fines which may hamper the extraction process.

The sugar beet cossettes or freshly ground or sliced sugar beet pulp material should immediately be placed in a stabilizer solution to prevent enzymatic and non-enzymatic darkening of the pulp. The majority of the enzymatic darkening is due to polyphenol oxidise activity. Suitable stabilizer solutions include water soluble bisulfides, sulfites and metabisulfites such as sodium sulfite, sodium bisulfite and sodium metabisulfite. Alternatively sulfur dioxide or its hydrated form, sulfurous acid, could be utilized. The preferred stabilizer solution is sodium metabisulfite at a concentration of from 0.005 to 0.5M. At this low concentration the sodium metabisulfite has a very minimal bleaching effect. Its purpose is to prevent both enzymatic and non-enzymatic browning reactions and not to whiten the product. The sugar beets at this point can be drained and further processed or frozen and stored.

The condition of the whole beets will have quite an effect on the color of the pulp obtained and thus on the color of the bulking agent obtained therefrom. This has proven to be quite important. In fact, it may be more critical than promptly processing the dewatered or diffused pulp and/or storing or freezing promptly. It has been found that pulp from beets processed early in the season is whiter than pulp obtained later in the season. Sugar beets that undergo a freeze/thaw cycle before being processed will likely rupture cell walls and release the enzyme polyphenol oxidise which will discolor the sugar beet pulp material. Also, it is preferably if the sugar beets are peeled prior to being processed. If the peel is not removed it will contribute to color problem in the final bulking agent product.

The coarsely ground or sliced sugar beet pulp after having been placed in the stabilizer solution is water-washed to remove a majority of the soluble carbohydrates. Preferably greater than 75% of the soluble carbohydrates are removed during the water washing, more preferably greater than 90%. The completely processed, dried sugar beet pulp bulking agent produced in accordance with this invention will contain less than 1% soluble carbohydrates. The majority of the soluble carbohydrates are removed during the water-washing step, however, some carbohydrates are removed during the alcoholic extraction of color and flavor constituents.

To maximize the removal of soluble carbohydrates, two or more water washes are preferable. After water-washing it is preferable to dewater the water-washed sugar beet pulp particles or slices in order to facilitate alcoholic removal of color and flavor constituents. Dewatering procedures include screw pressing, centrifugation, sieving, and alcoholic dehydration. These procedures are well known to those skilled in the art.

Suitable alcoholic solutions to accomplish the removal of bitter constituents and colors from the sugar beet pulp include methanol, ethanol or isopropanol alone or in combination with water. Other solvents which have been shown to remove bitter constituents and color include tertiary butyl alcohol, ethylene glycol mono methyl ether, 2-methyl ethyl ether and hexane. However these solvents are not as preferred as the aforementioned alcoholic solutions.

The preferable alcoholic solution is an isopropanol (IPA) concentration greater than 70 weight percent. 100% IPA can be used successfully yielding a dried product which has an extremely low bulk density. The preferred concentration of IPA is 70-80 weight percent if the sugar beet material is to be vacuum dried to a low IPA residual level in a single stage. It is difficult to vacuum dry 87% or greater IPA treated sugar beet pulp material in a single step. In order to maximize color removal from the sugar beet pulp material, countercurrent extraction is recommended because the most extracted material comes in contact with the freshest solvent. Since the sugar beet pulp material is very porous, it is desirable to minimize the chances of it retaining color-laden alcohol within its structure. Other processes to accomplish the alcoholic removal of color include batch extraction and single column leaching. These procedures are well known to the skilled artisan.

The removal of alcohol poses a difficult problem. There are different methods to maximize the removal of alcohol after color removal has been accomplished. The first alternative involves the utilization of an IPA/water solution of 78% or less followed by vacuum drying. While this concentration will assure maximum alcohol removal from the sugar beet pulp material, this low concentration does not produce the most optimal color and flavor removal. Another alternative involves utilizing a higher IPA/water concentration and a two phased approach of first removing alcohol and then drying the particles or slices. Moisture is necessary in the sugar beet pulp material to allow for the escape of alcohol. If the material is allowed to dry without first removing the alcohol, alcohol will be fixed within the structure and it will be extremely difficult to remove from the dry material. When the surface dries out and case hardens, any IPA present in the sugar beet core, slice or particle will be entrapped. Since most alcohol should be removed before water is driven off, water can be sprayed on the sugar beet pulp cossettes, slices or particles to keep the material moist. A rewet/redry process can be utilized as well as fluid bed drying wherein water is sprayed on the sugar beet pulp material to keep the surface porous so alcohol will not be fixed within the structure of the sugar beet pulp slice or particle. While the above specified methods are preferred, the sugar beet pulp material could be spread out on trays and allowed to air-dry.

After the sugar beet pulp material has been dried, it is preferably milled so as to produce the consistency of a flour, having an average particle size typically less than 100 microns, preferably less than 50 microns. This final reduction in particle size is critical to the functionality of the sugar beet pulp bulking agent and its successful incorporation into a food product, especially if it is to be baked.

The sugar beet pulp bulking agent produced in accordance with this present invention is bland and decolorized. Any detectable flavor and odor has been removed during alcoholic extraction. The exact preferable particle size will depend largely upon which food application the sugar beet pulp bulking agent will be put to. It contains less than 1% soluble carbohydrates, preferably less than 0.5%; less than 1000 ppm residual alcohol, preferably less than 250 ppm, most preferably zero. Greater than 95% of the coloration (determined by a colorimetric assay) has been removed from the sugar beet pulp bulking agent particles.

The sugar beet pulp bulking agent is a non-caloric ingredient. The term non-caloric means that sugar beet pulp bulking agent has 0 calories per gram. The caloric availability was measured by a bioassay technique relating animal growth to calories supplied. Specifically this was done by comparing the growth of animals eating a basal diet plus the sugar beet pulp bulking agent to the growth of animals eating the basal diet plus an appropriate standard, in this case sucrose. (For further information on this bioassay technique see Staub, H. W., Caloric Availability of Dietary Polyols, Fed. Proc., 37, 678. 1978; and Staub, H. W. and Ali, R. Chapter 4 Nutritional and Physiological Value of Gums in Food Hydrocolloids edited by Glicksman, M., CRC Press, Boca Raton, Fla., 1982.)

The sugar beet pulp bulking agent contains within the range of from 40 to 55% Neutral Detergent Residue (NDR) and from 20 to 35% crude fiber. The NDR or cell wall material in the detergent system of fiber analysis represents dietary fiber, consisting of the hemicelluloses, celluloses and lignin with perhaps some fiber bound protein. Other broader definitions of dietary fiber include unavailable storage polysaccharides, pectinaceous substances, gum, mucilages and modified polysaccharides. Certain other substances intimately associated with the plant cell wall such as small amounts of nonlignin phenols, cutin, phytic acid and some minerals are included in some definitions of dietary fiber. The polysaccharides associated with dietary fiber are not digested by mammalian digestive enzymes but are fermented in man by the colonic microflora.

Those skilled in the art will appreciate that the term dietary fiber is an indefinite one which has several meanings depending upon the method of assay among other variables. To remove this uncertainty, the definition of NDR in this application will be as defined by the method of Goering and Van Soest (Agriculture Handbook No. 379, A.R.S. USDA Washington, D.C., 1970) as modified and discussed by Robertson (Chapter 1. The detergent system of fiber analysis in *Topics in Dietary Fiber Research* edited by G. A. Spiller and R. J. Amen, Plenum Press N.Y. 1978).

Crude fiber is loss on ignition of dried residue remaining after digestion of sample with 1.25% sulfuric acid and 1.25% sodium hydroxide under specific conditions. Typical conditions and methodology are described in the Officials Methods of Analysis of the Association of Official Analytical Chemists.

The sugar beet pulp bulking agent contains within the range of from 15 to 25% total pectin. The sugar beet pulp bulking agent contains within the range of from 20% to 35% cellulose, from 10% to 20% hemicellulose, and from 1% to 5% lignin. The sugar beet pulp bulking agent contains within the range of from 2.5 to 5% ash and within the range of from 6 to 15% protein. The moisture content of the sugar beet pulp bulking agent is less than 10%. The bulk density of the sugar beet pulp bulking agent is within the range of 0.1 to 0.5 grams per cc.

The sugar beet pulp bulking agent will absorb moisture and will provide bulk for foods which it is incorporated into. The sugar beet pulp bulking agent has a water holding capacity of from 15 to 25 grams of water per 1 gram of bulking agent. The water binding capacity of the sugar beet pulp bulking agent was determined analytically as being the weight of water retained in a pellet formed by centrifuging a slurry of sugar beet pulp bulking agent in excess water.

The invention is illustrated, but not limited, by the following specific examples of the method of preparation of the sugar beet pulp bulking agent and its incorporation into a food product. It will be recognized that various additional modifications can be made without deviating from the scope of the invention.

EXAMPLE 1

This example describes a process for producing sugar beet pulp bulking agent from spent sugar beet cossettes.

Sugar beet cossettes (pulp) (generally 3-4 mm thick, and 4-5 cm long) were collected from a sugar processing plant immediately after the sugar was extracted (after the diffuser) or when the pulp exits from the press, used for dewatering. The pulp was immediately placed in a solution of sodium metabisulfite (0.05M) to prevent darkening of the pulp due to polyphenol oxidase activity. Approximately 4 pounds (wet weight) of sugar beet pulp per gallon of sodium metabisulfite solution was stirred for 1 hour to assure penetration of the cossettes by the metabisulfite. The drained sugar beet pulp were then frozen and stored.

At a later date, the material was thawed and water-washed at a ratio of 5:1, water to pulp. The sugar beet pulp was then centrifuged to remove the water. The color and flavor or the sugar beet pulp was then column extracted with 87% isopropyl alcohol at a ratio of 4:1, IPA to centrifuged pulp (wet weight). The waste IPA was then removed and the sugar beet pulp vacuum dried at 140° F. (60° C.). In order to achieve IPA levels under 500 ppm., it was necessary to rewet and redry the vacuum dried sugar beet pulp bulking agent. The material was then ground to an average particle size of 100 microns.

The above process produces a non-caloric ingredient containing 0 calories/gram. It contains less than 0.1% soluble carbohydrates and less than 500 ppm residual alcohol. More than 95% of the color was removed as determined by colorimetric assay. The sugar beet pulp bulking agent contained 3.2% ash, 3.6% water, and 9.3% protein.

EXAMPLE 2

The following formulation was used to make a 50% calorie reduced cake incorporating the sugar beet pulp bulking agent produced according to Example 1.

| Ingredient | Amount (gms.) |
|---|---|
| Water | 310 |
| Cake flour | 100 |
| Sugar | 90 |
| Sugar beet pulp bulking agent | 30 |
| Shortening (Durlo-Durkee) | 20 |
| Egg white solids | 20 |
| Baking soda | 6 |
| Sodium aluminum phosphate (Levair - Stauffer Chemical Co.) | 6 |
| Non fat milk solids | 5 |
| Sodium stearyl-2-lactylate (Emulsifier; Emplex-Patco) | 4 |
| Salt | 1 |
| Polyoxyethylene (20) sorbitan mono-oleate (Tween 80 - ICI Americas, Inc.) | 1 |
| Vanillin | 0.1 |

| Ingredient | Amount (gms.) |
|---|---|
| | 593.1 |

The sugar and shortening were creamed together in a Mixmaster bowl. Flour, sugar beet pulp, egg white solids, non fat milk solids, salt, vanillin and Emplex were dry blended and then added to the mixing bowl and blended in. The Tween 80 was dissolved in the water and added to the batter mix. The Levair and baking soda were dry blended and added to the mixing bowl and blended into the batter blending in the Mixmaster was continued for 5 minutes at the highest speed. The viscosity of the batter was measured by use of a Brookfield Viscometer (Model HAT using T-Bar B (36 mm.) at 5 rpm) and found to be 20,000 cps. Then 500 grams of the batter was poured into a lined and coated 8 inch baking pan and baked at 350° F. (177° C.) for 40 minutes resulting in a 10% bake loss. The resulting cake had a good height, structure, texture and appearance and was of excellent overall quality. The finished product was 49% calorie-reduced and had a moisture content of 47% on an as-consumed basis. The finished cake had a caloric value of 1.91 calories/gram as compared to conventional white cake with 3.75 calories/gram (U.S.D.A. Handbook #8).

What is claimed:

1. A process for producing a sugar beet pulp bulking agent from peeled whole sugar beet slices or particles, or spent sugar beet cossettes which comprises:
   (a) placing said peeled cossettes, particles or slices into a stabilizer solution of a water-soluble sulfite, bisulfite or metabisulfite in an effective concentration to prevent enzymatic and non-enzymatic darkening of the sugar beet pulp;
   (b) washing the thusly stabilized cossettes, particles or slices with water to remove substantially all of the soluble carbohydrates;
   (c) contacting the water-washed cossettes, particles or slices with an alcoholic solution to remove substantially all of the color and flavor constituents; and
   (d) removing water and alcohol from said cossettes, particles or slices to produce a bland, decolorized and odorless sugar beet pulp bulking agent.

2. The process according to claim 1 wherein the stabilizer is sodium metabisulfite at a concentration from 0.005 to 0.5M.

3. A process according to claim 1 which further comprises removing water from the water-washed sugar beet pulp cossettes, particles or slices by a dewatering procedure prior to the contacting with the alcoholic solution.

4. A process according to claim 3 wherein the dewatering procedure consists of screw pressing, centrifugation, alcoholic dehydration or sieving.

5. A process according to claim 1 wherein the alcoholic solution is selected from the group consisting of isopropanol, methanol and ethanol.

6. A process according to claim 5 wherein the alcoholic solution is isopropanol.

7. A process according to claim 6 wherein the isopropanol is of a concentration greater than 70 weight percent.

8. A process according to claim 1 wherein the contacting of the water-washed sugar beet pulp cossettes, particles or slices with the alcoholic solution is accomplished by continuous countercurrent extraction, batch extraction or single column leaching.

9. A process according to claim 1 wherein the removal of alcohol and water from the sugar beet pulp cossettes particles or slices is accomplished by vacuum-drying, fluid-bed-drying or air-tray-drying.

10. A process according to claim 1 further comprising the step of finely comminuting the sugar beet pulp bulking agent.

11. The process according to claim 10 wherein the finely comminuted sugar beet pulp bulking agent is of an average particle size of 100 microns or less.

12. The process according to claim 11 wherein the finely comminuted sugar beet pulp bulking agent is of an average particle size of 50 microns or less.

13. The process according to claim 1 wherein said sugar beet pulp bulking agent is non-caloric.

14. The product produced by the process of claims 1, 2, 6, 7, 10 or 13.

15. The product of claim 14 which has a water binding capacity of from 15 to 25 grams of water per one gram of said sugar beet pulp bulking agent.

16. A food product containing from 0.1 to 60% (dry basis) of the sugar beet pulp bulking agent of claim 14.

17. A bland, decolorized, odorless sugar beet pulp bulking agent produced by the process of claim 1 and containing: less than 1% soluble carbohydrates; less than 1000 ppm residual alcohol; less than 10% moisture content; greater than 95% removal of coloration; within the range of from 40–55 Neutral Detergent Residue; within the range of from 20–35% total pectin; within the range of from 20–35% cellulose; within the range of from 10–20% hemicellulose; within the range of from 1–5% lignin; within the range of from 2.5–5% ash; within the range of from 6–15% protein; and within the range of from 0.1–0.5% bulk density (g./cc.).

18. The produce of claim 17 wherein said sugar beet pulp bulking agent is non-caloric.

19. The product of claim 17 which will bind from 15 to 25 grams of water per 1 gram of said sugar beet pulp bulking agent.

20. A food product containing from 0.1% to 60% (dry basis) of the sugar beet pulp bulking agent products of claims 17, 18, or 19.

* * * * *